(12) United States Patent
Hong et al.

(10) Patent No.: US 10,559,790 B2
(45) Date of Patent: Feb. 11, 2020

(54) LITHIUM ION SECONDARY BATTERY CONFIGURED TO MAKE BEST USE OF AN ACCOMMODATING SPACE IN AN ELECTRONIC APPARATUS

(71) Applicant: ROUTE JADE INC., Nonsan-si, Chungcheongnam-do (KR)

(72) Inventors: Ji Jun Hong, Gwacheon-si (KR); In Joong Kim, Nonsan-si (KR); Kyung Joon Kim, Daejeon (KR); Young Ho Jung, Gyeryong-si (KR); Young Hun Jin, Gyeryong-si (KR); Taek Joo Jung, Sejong-si (KR)

(73) Assignee: ROUTE JADE INC., Nonsan-si, Chungcheongnam-Do (KR)

( * ) Notice: Subject to any disclaimer, the term of this patent is extended or adjusted under 35 U.S.C. 154(b) by 167 days.

(21) Appl. No.: 15/736,692

(22) PCT Filed: Jun. 13, 2016

(86) PCT No.: PCT/KR2016/006251
§ 371 (c)(1),
(2) Date: Dec. 14, 2017

(87) PCT Pub. No.: WO2016/204467
PCT Pub. Date: Nov. 22, 2016

(65) Prior Publication Data
US 2018/0183106 A1    Jun. 28, 2018

(30) Foreign Application Priority Data

Jun. 18, 2015    (KR) .................. 10-2015-0086922

(51) Int. Cl.
*H01M 2/10*       (2006.01)
*H01M 4/70*       (2006.01)
(Continued)

(52) U.S. Cl.
CPC ....... *H01M 2/1066* (2013.01); *H01M 2/1673* (2013.01); *H01M 2/18* (2013.01);
(Continued)

(58) Field of Classification Search
None
See application file for complete search history.

(56) References Cited

U.S. PATENT DOCUMENTS

| 2015/0033547 A1 | 2/2015 | Yang et al. | |
| 2015/0044536 A1* | 2/2015 | Kwon | H01M 2/0207 429/94 |
| 2015/0228963 A1* | 8/2015 | Kim | H01M 10/0436 429/133 |

FOREIGN PATENT DOCUMENTS

| CN | 104641502 A | 5/2015 |
| KR | 10-2001-0086415 A | 9/2001 |

(Continued)

*Primary Examiner* — Ula C Ruddock
*Assistant Examiner* — Tony S Chuo
(74) *Attorney, Agent, or Firm* — Novick, Kim & Lee, PLLC; Jae Youn Kim

(57) ABSTRACT

The present invention relates to a lithium ion secondary battery, and more particularly, to a lithium ion secondary battery which makes the best use of an accommodating space in electronic apparatus in which a secondary battery is accommodated or mounted to maximize a performance of the battery. A secondary battery includes an electrode assembly in which a plurality of pocketing anode bodies and a plurality of cathode bodies are alternately stacked, in which a concavely recessed space is formed in the electrode assembly, and the space may be formed in the plurality of pocketing anode bodies and the plurality of cathode bodies excluding a cathode body disposed at the lowest end of the electrode assembly.

12 Claims, 10 Drawing Sheets

(51) Int. Cl.
    *H01M 2/16*        (2006.01)
    *H01M 10/04*      (2006.01)
    *H01M 10/0585*   (2010.01)
    *H01M 2/18*        (2006.01)
    *H01M 4/36*        (2006.01)
    H01M 10/0525   (2010.01)
    H01M 2/02        (2006.01)
    H01M 4/38        (2006.01)
    H01M 4/485      (2010.01)
    H01M 4/587      (2010.01)

(52) U.S. Cl.
    CPC ............. *H01M 4/366* (2013.01); *H01M 4/70* (2013.01); *H01M 10/0436* (2013.01); *H01M 10/0585* (2013.01); H01M 2/0275 (2013.01); H01M 2/1653 (2013.01); H01M 4/382 (2013.01); H01M 4/485 (2013.01); H01M 4/587 (2013.01); H01M 10/0525 (2013.01); H01M 2220/30 (2013.01)

(56) References Cited

FOREIGN PATENT DOCUMENTS

| | | | |
|---|---|---|---|
| KR | 10-2011-0138718 A | 12/2011 | |
| KR | 10-2011-0138719 A | 12/2011 | |
| KR | 10-1168651 B1 | 7/2012 | |
| KR | 10-2013-0105272 A | 9/2013 | |
| KR | 10-2014-0034974 A | 3/2014 | |
| KR | 10-1387617 B1 | 4/2014 | |
| KR | 10-2014-0102379 A | 8/2014 | |
| KR | 10-2015-0034600 A | 4/2015 | |
| WO | WO 2014/042398 A1 * | 3/2014 | ............ H01M 10/04 |

\* cited by examiner

LITHIUM ION SECONDARY BATTERY CONFIGURED TO MAKE BEST USE OF AN ACCOMMODATING SPACE IN AN ELECTRONIC APPARATUS

TECHNICAL FIELD

The present invention relates to a lithium ion secondary battery, and more particularly, to a lithium ion secondary battery which is configured to make the best use of an accommodating space in an electronic apparatus in which a secondary battery is accommodated or mounted to maximize a performance of the battery.

BACKGROUND ART

As a market of portable electronic apparatuses such as mobile phones, camcorders, and notebook computers is expanding and diversifying, demands for rechargeable secondary batteries for supplying power are also expanding. Down-sizing, weight lightening, performance improvement, and multi functionalizing of portable electronic apparatuses require continuous improvement of an energy storage density of a secondary battery which is used as a power source. Therefore, as a result of many years of studies for satisfying the demands, a lithium ion secondary battery which employs a carbon cathode which is capable of reversible intercalation and deintercalation of lithium and an anode material which is capable of reversible intercalation and deintercalation of lithium appears.

As compared with an aqueous system secondary battery of the related art such as nickel-cadmium and nickel hydrogen, the lithium ion secondary battery has a higher energy density per unit weight and a longer charging/discharging life. Therefore, the lithium ion secondary battery is rapidly replacing the existing batteries as a new energy source for the portable electronic devices. However, even though in accordance with rapid development and diversification of the portable electronic apparatuses, demands for selecting a battery having a higher energy density and various specifications are rapidly increasing, the existing lithium ion secondary battery does not satisfy the above-mentioned demands.

Specifically, rapid thickness reducing and down-sizing of the electronic apparatus rapidly expand the demands for a thin lithium ion secondary battery. However, when an assembling method of a cylindrical or rectangular lithium ion secondary battery of the related art is directly employed, the energy density per volume is too much lowered due to the thin thickness. Therefore, it is determined that the development of a thin lithium ion secondary battery having a high energy density per volume is essential to accomplish down-sizing, weight lightening, and thickness reducing of various portable electronic apparatuses.

Therefore, in order to solve the above-mentioned problems, the applicant developed a secondary battery using a pocketing electrode body and a lithium ion secondary battery using a pocketing electrode body and a manufacturing technique are disclosed in Korean Registered Patent Nos. 10-1168651 and 10-0337707 which are filed and registered by the applicant.

The related-art patents solve some of the above-mentioned problems. However, there is a problem in that in the lithium ion secondary battery using a pocketing electrode body, a flat or pouch-shaped external case such as a coin type or a button type is generally manufactured as a typical shape, so that when a shape of the electronic apparatus in which the secondary battery is used is changed, the secondary battery having a typical shape cannot be used.

Recently, since a design of the electronic apparatus becomes one of major selection criteria of consumers, a lot of curved electronic apparatuses having a stylish and beautiful shape have been released.

However, when the secondary battery of the related art is accommodated in the curved electronic apparatus or an electronic apparatus in which an uneven space is inevitably formed due to electronic parts, there may be a remaining space in the secondary battery accommodating space in the electronic apparatus which is not filled by the secondary battery.

Further, when a protrusion is formed in a case where the secondary battery is received, a space where the secondary battery is accommodated is reduced due to the protrusion so that the accommodating space is not appropriately utilized.

Therefore, the secondary battery of the related art cannot efficiently utilize the remaining space of the accommodating space so that the secondary battery of the related art is not satisfactorily applied to a curved electronic apparatus or an electronic apparatus having an uneven space or a space formed by a protrusion in terms of a battery capacity or a usage time.

Therefore, the applicant suggests the present invention which may increase the battery capacity or a usage time of a secondary battery by efficiently utilizing a remaining space of the accommodating space and provide a shape and structure for reducing restrictions on a shape of the electronic apparatus in which the secondary battery is used.

DISCLOSURE

Technical Problem

In order to solve the above-described problems, an aspect of the present invention provides a lithium ion secondary battery which does not lower a performance of a secondary battery by making the best use of a battery accommodating space of the electronic apparatus.

Further, an aspect of the present invention also provides a lithium ion secondary battery which may minimize a shape restriction of an electronic apparatus in which a secondary battery is used.

Technical Solution

According to an aspect of the present invention, there is provided a lithium ion secondary battery including: an electrode assembly in which a plurality of pocketing anode bodies and a plurality of cathode bodies are alternately stacked in which a concavely recessed space is formed in the electrode assembly and a protrusion of the electronic apparatus is inserted into the space.

Further, the pocketing anode body may include an anode plate which has a coating layer of lithium or lithium metal complex oxide as an anode active material and a plain protrusion and has a first through hole formed therethrough; one pair of separation films which covers both surfaces of the anode plate while exposing only the plain protrusion; and a film unit which is located between the pair of separation films in the entire or partial circumference of the anode plate to be attached to the pair of separation films.

Further, the film unit may include a first insulating member which is located between the pair of separation films in the entire or partial outer circumference of the anode plate to be attached to the pair of separation films; and a second insulating member which is located between the pair of separation films in the entire or partial inner circumference of the anode plate which forms the first through hole to be attached to the pair of separation films.

Further, the film unit may include a connecting member which connects the first insulating member and the second insulating member to each other.

Further, both ends of the connecting member may be connected to at least one portion of an inner circumferential direction of the first insulating member and an outer circumferential direction of the second insulating member.

Further, a cut-out portion in which the connecting member is received may be formed in the anode plate.

Further, the cathode body may include a cathode plate which has a carbonaceous cathode active material coating layer which absorbs or desorbs lithium and a plain protrusion and a second through hole which corresponds to and communicates with the first through hole is formed in the cathode plate of the cathode body.

Further, the second through hole may be selectively formed or may not be formed in a cathode plate of the cathode body which is disposed at the lowest end of the electrode assembly.

Further, a portion of the pair of separation films corresponding to the first through hole of the anode plate may be heated and pressurized to be attached to an inner surface of the second insulating member and a surface of the cathode plate of the cathode body disposed at the lowest end of the electrode assembly.

Further, a space formed in the electrode assembly may be formed to have a shape of hole by an inner surface of the second insulating member which is received in the first through hole and an inner surface of the cathode plate which forms the second through hole or formed to have a shape of groove by the inner surface of the second insulating member which is received in the first through hole, the inner surface of the cathode plate which forms the second through hole, and an upper surface of the cathode plate disposed at the lowest end of the electrode assembly.

Further, adhesive materials may be applied on both surfaces of the first insulating member, the second insulating member, and the connecting member which face the pair of separation films.

Further, a position determining unit where the first insulating member is located may be represented in any one separation film between the pair of separation films.

Further, a receiving unit in which the plain protrusion of the anode plate is received may be formed in the first insulating member.

Further, adhesive materials may be applied on both surfaces of the first insulating member, the second insulating member, and the connecting member which face the pair of separation films.

Further, the first insulating member, the second insulating member, and the connecting member may include any one selected from a group consisting of a polyolefin resin film, a polyester resin film, a polystyrene resin film, a polyimide film, a fluorocarbon resin film, an ABS film, a polyacrylic film, an acetal film, and a polycarbonate film.

Further, the first insulating member, the second insulating member, and the connecting member may include any one adhesive component selected from a high temperature melting adhesive material group consisting of ethylene vinyl acetate, ethylene ethyl acetate, an ethylene acrylic acid based compound, an ionomer based compound, polyethylene, polyvinyl acetate, and polyvinyl butyral.

Advantageous Effects

In the lithium ion secondary battery according to the exemplary embodiment of the present invention, a plurality of electrode assemblies having different sizes is stacked in multiple levels to be received in a secondary battery accommodating space of an electronic apparatus having a curved space or a secondary battery accommodating space of an electronic apparatus having an uneven portion or a protrusion due to height difference in accordance with arrangement of electronic parts so that it is possible to make the best use of the secondary battery accommodating space in the electronic apparatus.

The secondary battery according to the exemplary embodiment of the present invention may make the best use of the remaining space of the accommodating space of the secondary battery of the electronic apparatus, so that a battery capacity and a battery usage time may be increased.

Further, in the lithium ion secondary battery according to the exemplary embodiment of the present invention, since it is possible to make the best use of the remaining space of the secondary battery accommodating space of the electronic apparatus, the space for increasing the battery capacity and the battery usage time is not limited to a rectangular shape or a cylindrical shape, so that the electronic apparatus may be designed to have various designs.

MODE FOR INVENTION

Advantages and characteristics of the present disclosure and a method of achieving the advantages and characteristics will be clear by referring to exemplary embodiments described below in detail together with the accompanying drawings.

However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

Hereinafter, a secondary battery 100 having a step cell structure according to an exemplary embodiment of the present invention will be described with reference to FIGS. 1 to 7.

Figure 1:
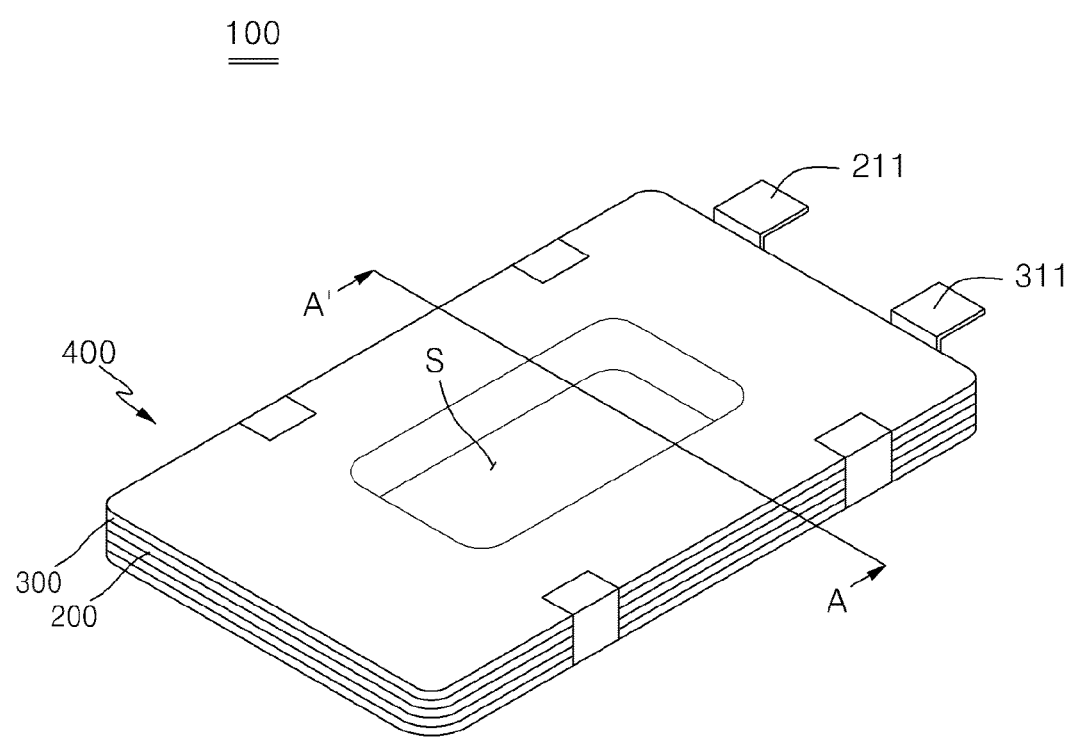
FIG. 1 is a perspective view of a lithium ion secondary battery according to an exemplary embodiment of the present invention.
Figure 2:
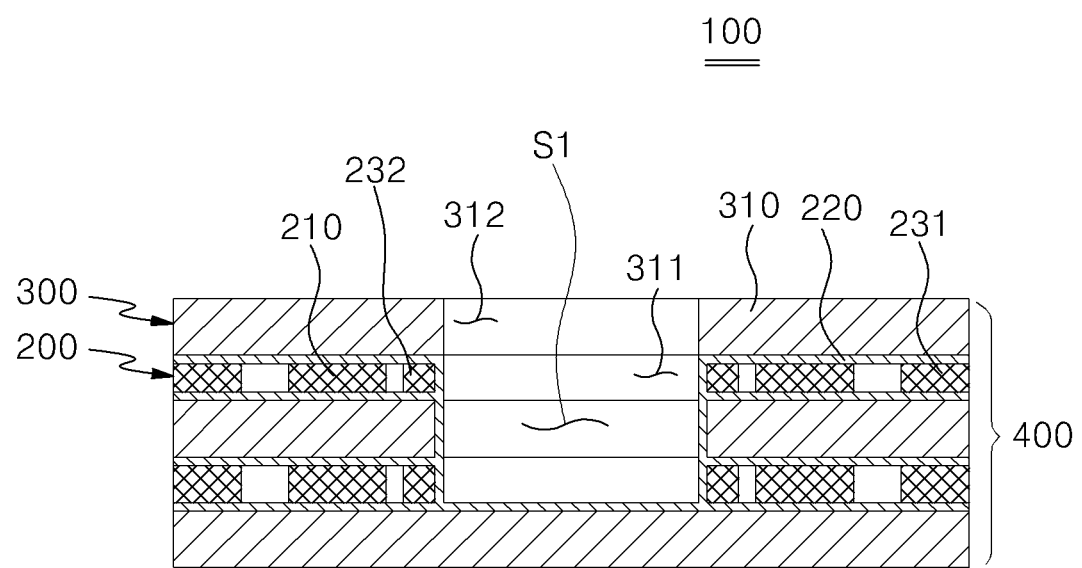
FIG. 2 is a cross-sectional view of a lithium ion secondary battery illustrated in FIG. 1 which is taken along the line A-A' and seen from an arrow direction.

As illustrated in FIGS. 1 and 2, a lithium ion secondary battery 100 according to an exemplary embodiment of the present invention may include an electrode assembly 400 in which a plurality of pocketing anode bodies 200 and a plurality of cathode bodies 300 are alternately stacked.

A space S1 in which a protrusion 11 (see FIG. 7) which protrudes toward a battery accommodating space of an electronic apparatus is inserted and received is formed in the electrode assembly 400. The space S1 is formed by first through holes 212 and second through holes 312 formed in the plurality of pocketing anode bodies 200 and the plurality of cathode bodies 300.

Figure 10:
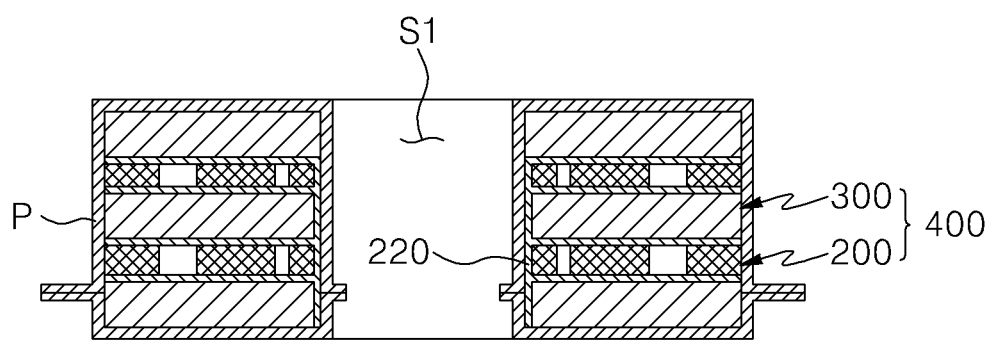
FIG. 10 is a cross-sectional view of a pouch secondary battery illustrated in FIG. 9 which is taken along the line A-A' and seen from an arrow direction.

As illustrated in FIG. 2, the space S1 may be formed on the electrode assembly 400 to have a shape of groove or may be formed to have a shape of hole as illustrated in FIG. 10.

That is, when the space S1 is formed on the electrode assembly 400 to have a shape of groove, as illustrated in FIG. 2, the space S1 may be formed by the first through holes 212 and the second through holes 312 formed in the plurality of pocketing anode bodies 200 and the plurality of cathode bodies 300 excluding a cathode body 300 which is disposed at the lowest end of the electrode assembly 400.

In contrast, when the space S1 is formed on the electrode assembly 400 to have a shape of hole, as illustrated in FIG. 10, the space S1 may be formed by the first through holes 212 and the second through holes 312 formed in all the plurality of pocketing anode bodies 200 and the plurality of cathode bodies 300 which configure the electrode assembly 400.

Figure 3:
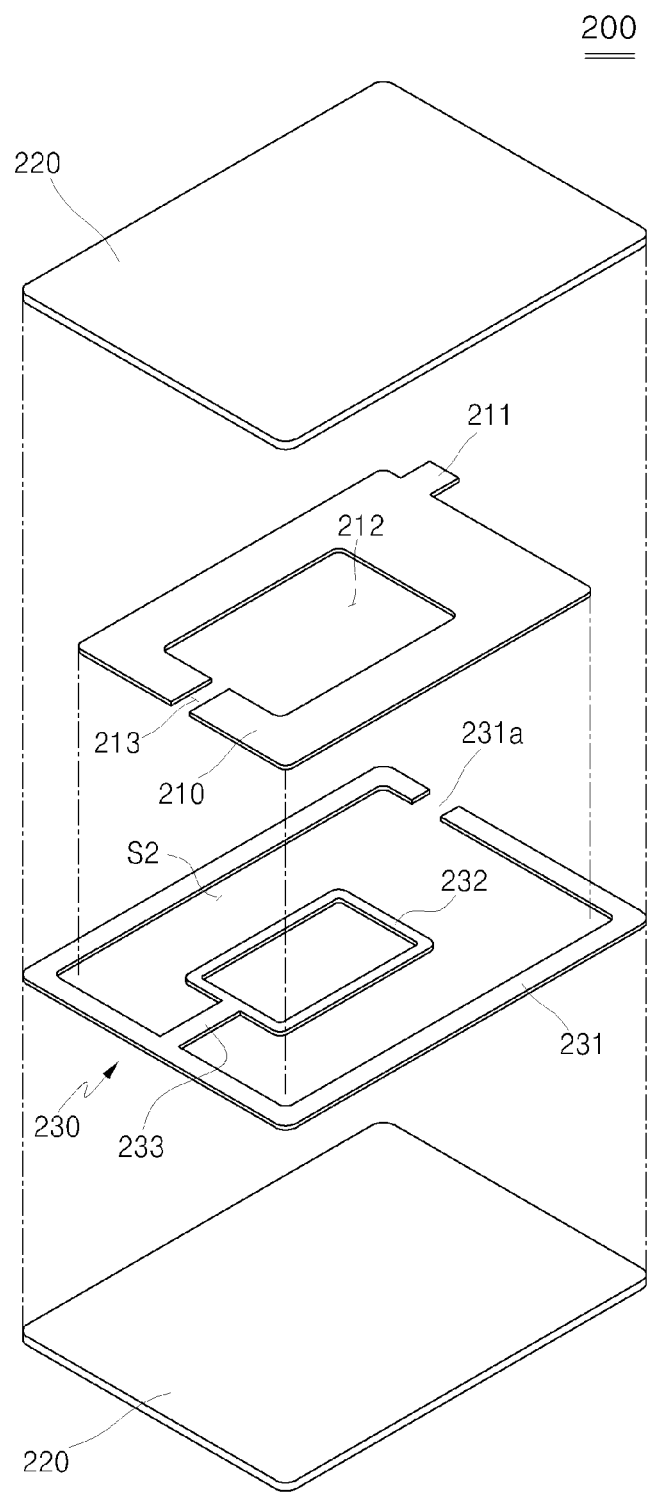
FIG. 3 is an exploded perspective view of a pocketing anode electrode body according to an exemplary embodiment of the present invention.
Figure 4:
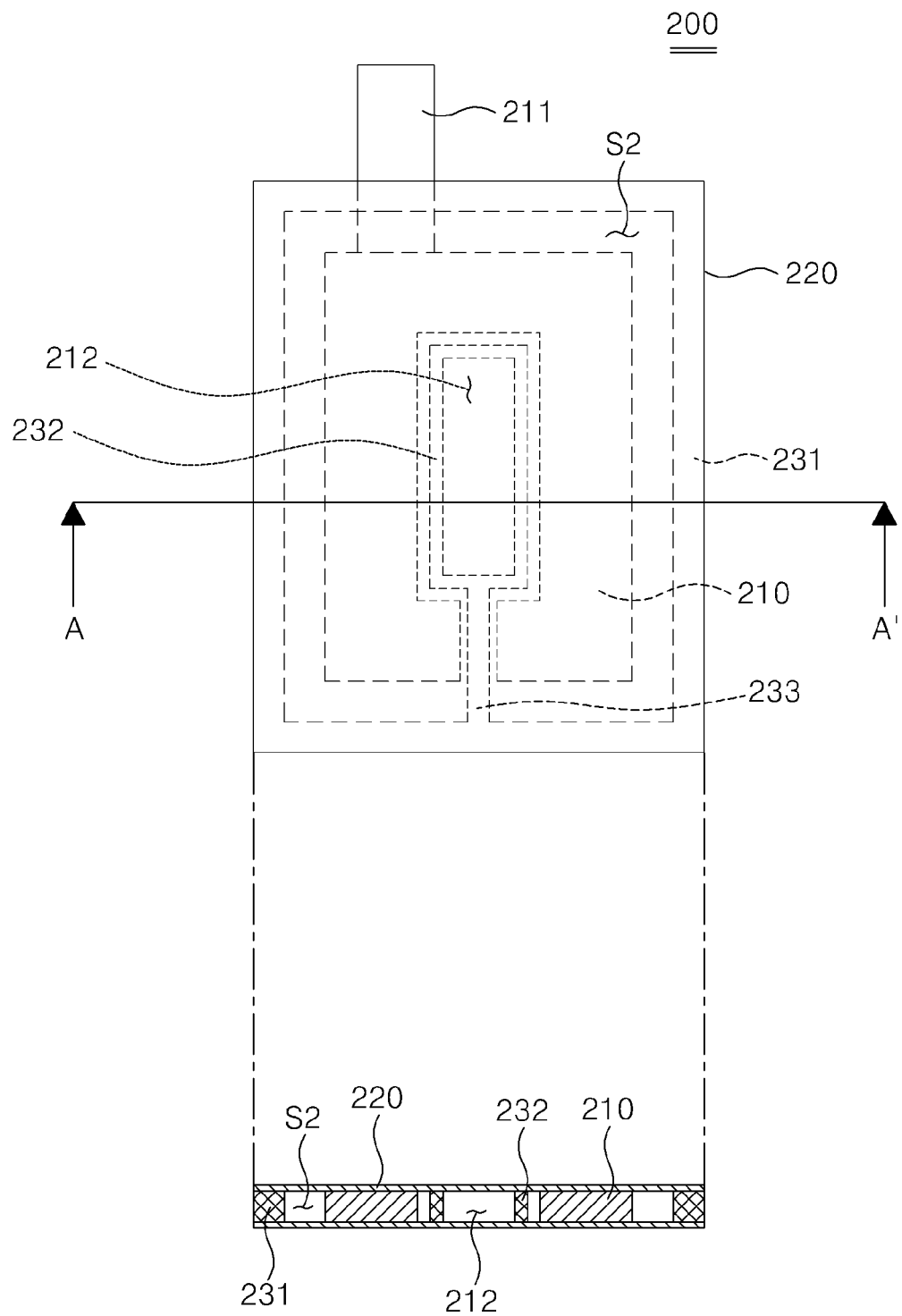
FIG. 4 is a plan view and a cross-sectional view of a pocketing anode body according to an exemplary embodiment of the present invention.

Therefore, the pocketing anode body 200, as illustrated in FIGS. 3 and 4, includes an anode plate 210 which has a coating layer of lithium or a lithium metal complex oxide as an anode active material and a plain protrusion 211 and a first through hole 212 in which a protrusion 11 protruding toward the battery accommodating space of the electronic apparatus is inserted, a pair of separation films 220 which cover both surfaces of the anode plate 210 while exposing only the plain protrusion 211, and a film unit 230 which is disposed between one pair of separation films 220 in the entire or partial circumference of the anode plate 210 to be attached to one pair of separation films 220.

Figure 5:
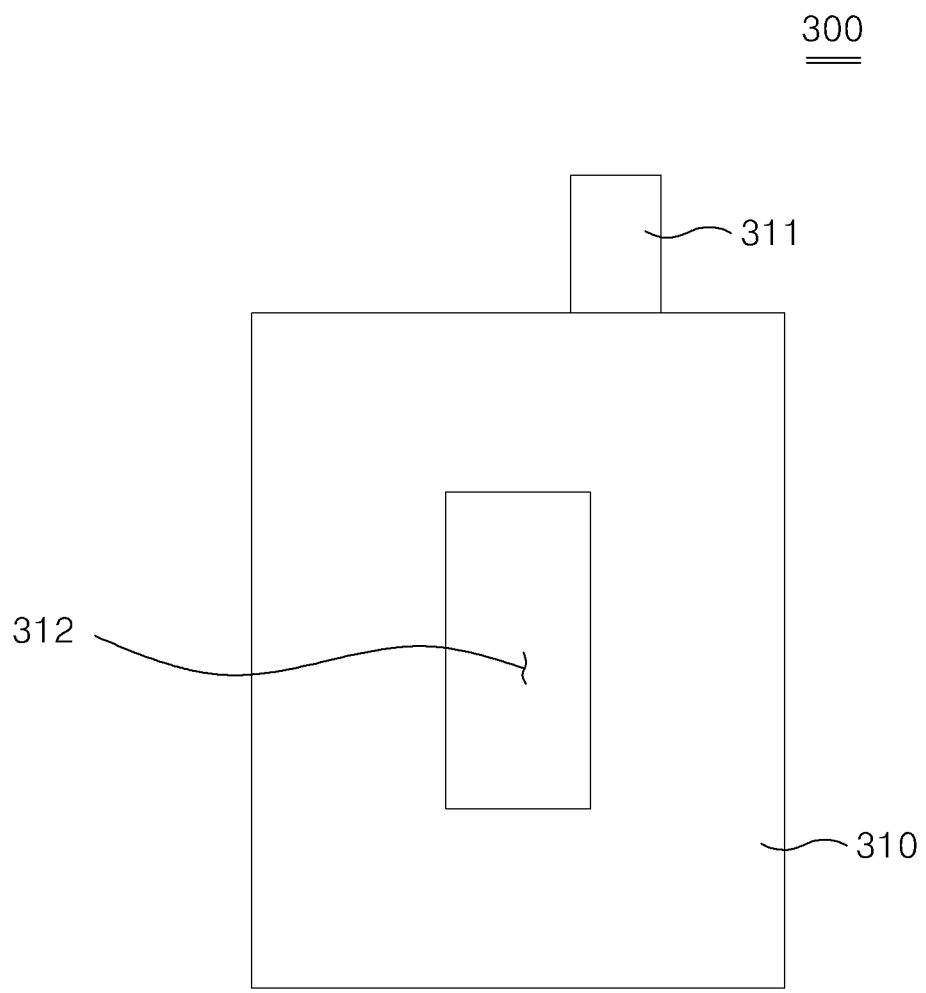
FIG. 5 is a plan view of a cathode body according to an exemplary embodiment of the present invention.

The cathode body 300, as illustrated in FIG. 5, may include a cathode plate 310 which has a carbonaceous cathode active material which absorbs or desorbs lithium and a plain protrusion 311 and a second through hole 312 corresponding to and communicating with the first through hole 212 formed in the anode plate 210 is formed in the cathode plate 310.

The cathode plate 310 of the cathode body 300 is essentially formed to be larger than the anode plate 210 to stably absorb lithium ions discharged from the anode plate 210 of the pocketing anode body 200.

When the space S1 is formed to have a shape of groove, as described above, the second through hole 312 is not formed in the cathode plate 310 of the cathode body 300 disposed at the lowest end of the electrode assembly 400. In contrast, when the space S1 is formed to have a shape of hole which passes through the electrode assembly 400, the second through hole 312 may be formed in all the cathode plates 310 of the cathode body 300 which configure the electrode assembly 400.

The shape of the space S1 may be the shape of the groove or hole corresponding to a protruding length, a protruding direction, and the number of protrusions 11 (see FIG. 7) which protrude toward the battery accommodating space of the electronic apparatus. Therefore, the second through hole 312 may be selectively formed or may not be formed in the cathode plate 310 of the cathode body 300 disposed at the lowest end of the electrode assembly 400.

The film unit 230 of the pocketing anode body 200, as illustrated in FIGS. 3 and 4, may include a first insulating member 231 which is located between one pair of separation films 220 in the entire or partial outer circumference of the anode plate 210 to be attached to one pair of separation films 220 and a second insulating member 232 which is located between one pair of separation films 220 in the entire or partial inner circumference of the anode plate 210 which is formed by partitioning the first through hole 212 to be attached to one pair of separation films 220.

The first insulating member 231 and the second insulating member 232 cooperate with each other to form a punching space S2 in which the anode plate 210 is received.

The punching space S2 has a shape or a size which is capable of receiving the anode plate 210. In the exemplary embodiment of the present invention, the punching space S2 is formed to have a quadrangular frame corresponding to a shape of the anode plate 210, but is not limited thereto and may be manufactured to have a circular or polygonal frame.

The anode plate 210 may be spaced apart from the first insulating member 231 and the second insulating member 232 which form the punching space S2 to be received in the punching space S2 with a predetermined interval therefrom.

That is, an outer surface of the anode plate 210 is spaced apart from an inner surface of the first insulating member 231 and an inner surface of the anode plate 210 which forms the first through hole 212 is spaced apart from the outer surface of the second insulating member 232.

In the meantime, the film unit 230 may further include a connecting member 233 which connects the first insulating member 231 and the second insulating member 232 to each other.

Both ends of the connecting member 233 may be connected to at least one part of an inner circumferential direction of the first insulating member 231 and an outer circumferential direction of the second insulating member 232.

The connecting member 233 may allow the second insulating member 232 to be located in a predetermined position while the second insulating member 232 is received in the first through hole 212 of the anode plate 210 to be disposed along the inner circumferential direction of the anode plate 210.

That is, when the first insulating member 231 of the film unit 230 is located in the separation film 220 disposed below the anode plate 210 between one pair of separation films 220, the connecting member 233 may allow the second insulating member 232 to be located to be received in the first through hole 212 of the anode plate 210.

Here, a cut-out portion 213 may be formed in the anode plate 210 to receive the connecting member 233 of the film unit 230 therein.

When the anode plate 210 is located in any one separation film 220 between one pair of separation films 220 to which the film unit 230 is attached to be received in the punching space S2 formed by the film unit 230, the cut-out portion 213 prevents the anode plate 210 from being received in the punching space S2 in a state in which the anode plate 210 is stacked above the connecting member 233 of the film unit 230.

When the cut-out portion 213 is not formed in the anode plate 210, the anode plate 210 is stacked above the connecting member 233. Therefore, a gap is formed between the anode plate 210 and one pair of separation films 220. As a result, when the plurality of pocketing anode bodies 200 and the plurality of cathode bodies 300 are alternately stacked, a gap is formed between the pocketing anode bodies 200 and cathode bodies 300 so that a performance of the battery may be deteriorated.

Further, the connecting member 233 is illustrated to connect a center of the inner surface of the first insulating member 231 and a center of the outer surface of the second insulating member 232 in the drawing, but is not limited thereto. That is, as long as the connecting member 233 connects the inner surface of the first insulating member 231 and the outer surface of the second insulating member 232, a forming position of the connecting member 233 or the number of connecting members may be selectively formed in at least one of the inner circumferential direction of the first insulating member 231 and the outer circumferential direction of the second insulating member 232.

An adhesive material may be applied on the first insulating member 231 and the second insulating member 232, and the connecting member 233 of the film unit 230. That is, the adhesive material may be applied on both sides of the first insulating member 231 and the second insulating member 232 and the connecting member 233 which face the pair of separation films 220.

Further, the first insulating member 231 and the second insulating member 232, and the connecting member 233 of the film unit 230 may include any one selected from a group consisting of a polyolefin resin film, a polyester resin film, a polystyrene resin film, a polyimide film, a polyamide film, a fluorocarbon resin film, an ABS film, a polyacrylic film, an acetal film, and a polycarbonate film.

The first insulating member 231 and the second insulating member 232 and the connecting member 233 may desirably include any one adhesive component selected from a high temperature melting adhesive material group consisting of ethylene vinyl acetate, ethylene ethyl acetate, an ethylene acrylic acid based compound, an ionomer based compound, polyethylene, polyvinylacetate, and polyvinyl butyral.

Further, a receiving unit 231a in which the plain protruding unit 211 of the anode plate 210 is received may be formed in the first insulating member 231.

When the anode plate 210 is received in the punching space S2 of the film unit 230, the receiving unit 231a prevents the plain protruding unit 211 of the anode plate 210 from being stacked above the first insulating member 231 which is attached to any one separation film 220 of the pair of separation films 220.

When the receiving unit 231a is not formed in the first insulating member 231, since the plain protruding unit 211 of the anode plate 210 is stacked above the first insulating member 210, a gap is inevitably formed between the anode plate 210 and the pair of separation films 220. Therefore, when the plurality of pocketing anode bodies 200 and the plurality of cathode bodies 300 are alternately stacked, a gap is formed between the pocketing anode bodies 200 and the cathode bodies 300 so that the performance of the battery may be deteriorated.

The receiving unit 231a may be formed in a partial circumferential direction of the first insulating member 231. When the anode plate 210 is received in the punching space S2, the receiving unit 231a may be formed in a position corresponding to the plain protruding unit 211 of the anode plate 210.

Figure 6:
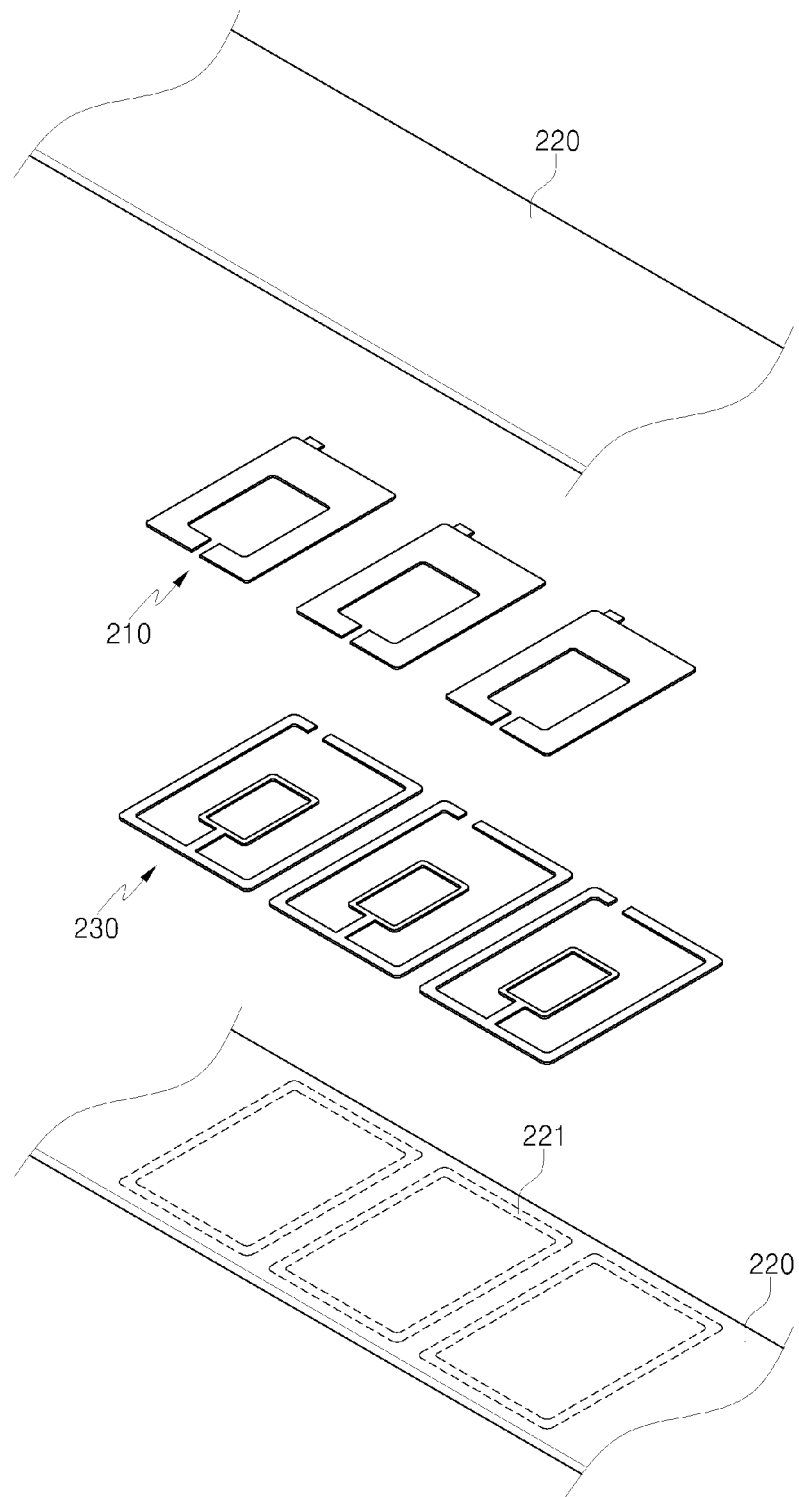
FIG. 6 is a perspective view illustrating a state where a plurality of anode plates and a plurality of film units are disposed between one pair of separation films according to an exemplary embodiment of the present invention.

A position determining unit 221 which guides a position where the first insulating member 231 of the film unit 230 is located may be represented in any one separation film 220 between the pair of separation films 220, as illustrated in FIG. 6.

The position determining unit 221 may allow an operator to simply and precisely attach the plurality of film units 230 to a strip shaped separation film 220 at predetermined position.

Further, a portion of the pair of separation films 220 corresponding to the first through hole 212 of the anode plate 210 is pressurized by a heating and pressurizing means not illustrated to be attached to the inner surface of the second insulating member 232 and a surface of the cathode plate 310 of the cathode body 300 disposed at the lowest end of the electrode assembly 400, as illustrated in FIG. 2. Therefore, the space unit S1 formed in the electrode assembly 400 may be formed to have a shape of groove by the inner surface of the second insulating member 232 received in the first through hole 212, the inner surface of the cathode plate 310 which forms the second through hole 312, and an upper surface of the cathode plate 310 disposed at the lowest end of the electrode assembly 400. Alternatively, the space unit S1 may be formed to have a shape of hole by the inner surface of the second insulating member 232 received in the first through hole 212 and the inner surface of the cathode plate 310 which forms the second through hole 312.

Figure 7:
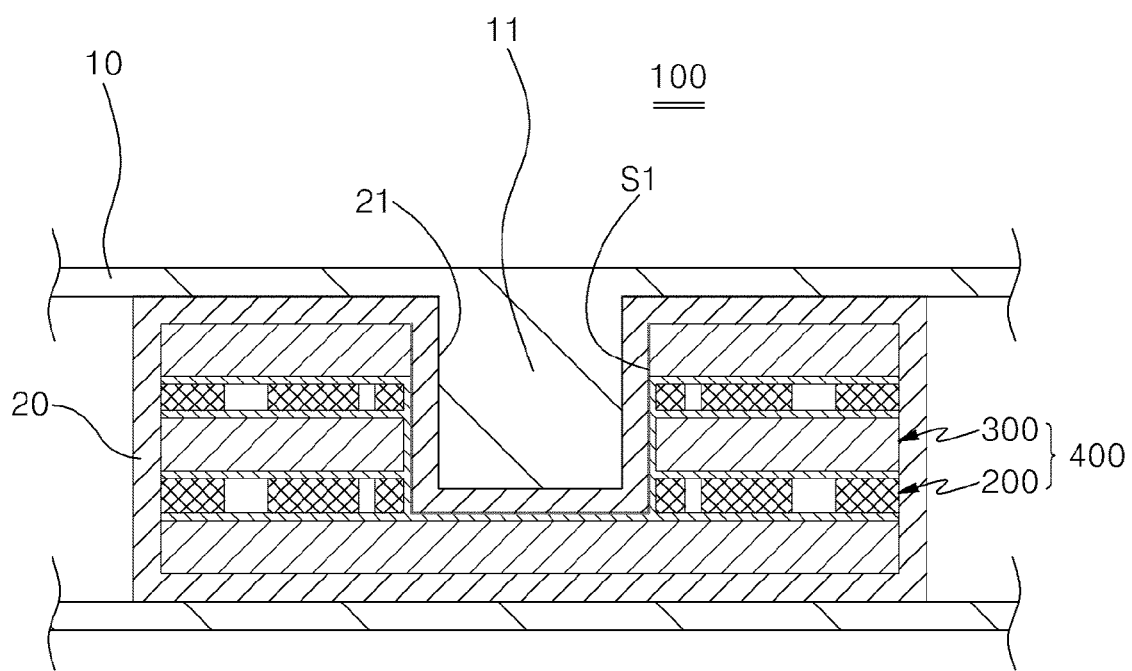
FIG. 7 is a view illustrating a state in which a lithium ion secondary battery according to an exemplary embodiment of the present invention is accommodated in a battery accommodating space of an electronic apparatus.

Therefore, as illustrated in FIG. 7, the protrusion 11 of the electronic apparatus 10 which protrudes toward the battery accommodating space of the electronic apparatus may be inserted in the space unit S1 while being received in a groove 21 of a battery can 20 which encloses the electrode assembly 400.

In the meantime, the lithium ion secondary battery 100 according to the exemplary embodiment of the present invention configured as described above may be sealed by various packaging materials and may be used as a can type or a pouch type battery depending on the packaging materials.

Figure 8:
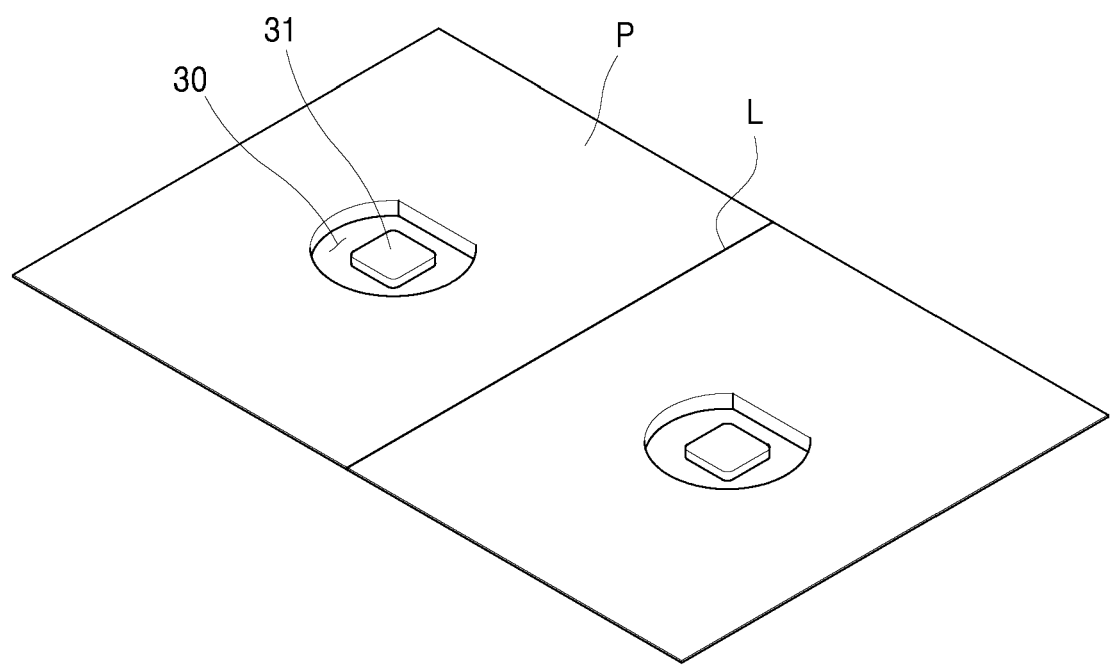
FIG. 8 is a perspective view of a pouch which seals an electrode assembly of the present invention.

In this case, the packaging material which seals the lithium ion secondary battery 100 is a flexible pouch, as illustrated in FIG. 8, a pair of receiving grooves 30 in which the electrode assembly 400 is accommodated and an insertion portion 31 which protrudes in the pair of receiving grooves 30 to be inserted in the space S1 formed in the electrode assembly 400 may be desirably formed in the pouch P.

The pair of receiving grooves 30 is formed to have a shape corresponding to an external shape of the electrode assembly 400. When the pouch P is folded in half with respect to a folding line L, the pair of receiving grooves 30 may be desirably formed in corresponding positions.

This is because when a sealing job of the electrode assembly 400 which is inserted in any one receiving groove 30 between the pair of receiving grooves 30 is performed, if the operator just folds the pouch P in half along the folding line L, the pair of receiving grooves 30 is mated with each other to seal the electrode assembly 400.

The insertion portion 31 may be formed in each of the pair of receiving grooves 30 or may be formed in only any one receiving groove 30 of the pair of receiving grooves 30. That is, when the space S1 formed in the electrode assembly 400 is formed to have a shape of groove, the insertion portion 31 is formed only in any one receiving groove 30 between the pair of receiving grooves 30. In contrast, when the space S1 is formed to have a shape of hole, as illustrated in FIG. 8, the space S1 is formed in each of the pair of receiving grooves 30 to be inserted into an upper portion and a lower portion of the space S1 of the electrode assembly 400.

Figure 9:
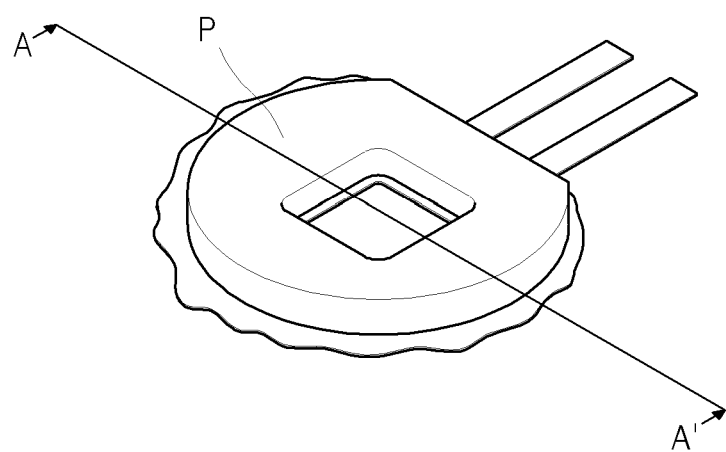
FIG. 9 is a perspective view illustrating a state in which the electrode assembly is sealed by the pouch of FIG. 8.

The pouch P which has a configuration as described above, as illustrated in FIGS. 9 and 10, is cut to have a shape corresponding to an external shape of the electrode assembly 400 while sealing the electrode assembly 400 and then the cut portion may be sealed. In this case, in the inserting portion 31 of the pouch P which is inserted in the space S1 of the electrode assembly 400, a portion which is not bonded to the inner surface of the electrode assembly 400 which partitions the space S1 is also cut and then the cut portion may be sealed.

For reference, in FIG. 10, it is illustrated that the space S1 formed in the electrode assembly 400 has a shape of a hole which passes through the electrode assembly 400.

The lithium ion secondary battery 100 according to the exemplary embodiment of the present invention having the configuration as described above may make the best use of the remaining space of the accommodating space of the secondary battery of the electronic apparatus, so that a battery capacity and a battery usage time may be increased.

Further, in the lithium ion secondary battery 100 according to the exemplary embodiment of the present invention, the secondary battery accommodating space of the electronic apparatus is not limited to a rectangular shape or a cylindrical shape, so that the electronic apparatus may be designed to have various designs.

For now, although a specific exemplary embodiment of the present invention has been described above, it is obvious that various changes are allowed without departing the scope of the present invention.

Accordingly, the scope of the present invention is not construed as being limited to the described embodiments but is defined by the appended claims as well as equivalents thereto.

INDUSTRIAL APPLICABILITY

The present invention may be applied to various electronic apparatuses such as a camera or a notebook, and may be sold together with the electronic apparatus or separately sold to consumers.

The invention claimed is:

1. A lithium ion secondary battery comprising:
an electrode assembly in which a plurality of pocketing anode bodies and a plurality of cathode bodies are alternately stacked,
wherein a concavely recessed space is formed in the electrode assembly and a protrusion of an electronic apparatus is inserted into the space,
wherein one of the pocketing anode bodies includes:
an anode plate which has a coating layer of lithium or lithium metal complex oxide as an anode active material, has a plain protrusion, and has a first through hole formed therethrough;
a pair of separation films which covers both surfaces of the anode plate while exposing only the plain protrusion; and
a film unit which is located between the pair of separation films to be attached to the pair of separation films,
wherein the film unit includes:
a first insulating member which is located between the pair of separation films in an entire or partial outer circumference of the anode plate to be attached to the pair of separation films; and
a second insulating member which is located between the pair of separation films in an entire or partial inner circumference of the anode plate which forms the first through hole to be attached to the pair of separation films, and
wherein the film unit includes a connecting member which connects the first insulating member and the second insulating member to each other.

2. The lithium ion secondary battery according to claim 1, wherein both ends of the connecting member are connected to at least one portion of an inner circumferential portion of the first insulating member and an outer circumferential portion of the second insulating member.

3. The lithium ion secondary battery according to claim 1, wherein a cut-out portion in which the connecting member is received is formed in the anode plate.

4. The lithium ion secondary battery according to claim 1, wherein the cathode body includes a cathode plate which has a carbonaceous cathode active material coating layer which absorbs or desorbs lithium and a plain protrusion, and a second through hole which corresponds to and communicates with the first through hole is formed in the cathode plate of the cathode body.

5. The lithium ion secondary battery according to claim 4, wherein the second through hole is disposed at the lowest end of the electrode assembly.

6. The lithium ion secondary battery according to claim 5, wherein a portion of the pair of separation films corresponding to the first through hole of the anode plate is heated and pressurized to be attached to an inner surface of the second insulating member and a surface of the cathode plate of the cathode body disposed at the lowest end of the electrode assembly.

7. The lithium ion secondary battery according to claim 6, wherein the space formed in the electrode assembly is formed to have a shape of hole by an inner surface of the second insulating member which is received in the first through hole and an inner surface of the cathode plate which forms the second through hole or formed to have a shape of groove by the inner surface of the second insulating member which is received in the first through hole, the inner surface of the cathode plate which forms the second through hole, and an upper surface of the cathode plate disposed at the lowest end of the electrode assembly.

8. The lithium ion secondary battery according to claim 1, wherein adhesive materials are applied on both surfaces of the first insulating member, the second insulating member, and the connecting member which face the pair of separation films.

9. The lithium ion secondary battery according to claim 1, wherein a position determining unit where the first insulating member is located is represented in any one separation film of the pair of separation films.

10. The lithium ion secondary battery according to claim 1, wherein a receiving unit in which the plain protrusion of the anode plate is received is formed in the first insulating member.

11. The lithium ion secondary battery according to claim 1, wherein the first insulating member, the second insulating member, and the connecting member include any one selected from a group consisting of a polyolefin resin film, a polyester resin film, a polystyrene resin film, a polyimide film, a fluorocarbon resin film, an ABS film, a polyacrylic film, an acetal film, and a polycarbonate film.

12. The lithium ion secondary battery according to claim 1, wherein the first insulating member, the second insulating member, and the connecting member include any one adhesive component selected from a high temperature melting adhesive material group consisting of ethylene vinyl acetate, ethylene ethyl acetate, an ethylene acrylic acid based compound, an ionomer based compound, polyethylene, polyvinyl acetate, and polyvinyl butyral.

* * * * *